United States Patent [19]

Caulfield

[11] Patent Number: 4,842,442
[45] Date of Patent: Jun. 27, 1989

[54] SEAWALL EXTENSION APPARATUS

[76] Inventor: Hubert E. Caulfield, 1351 Bay St., S.E., St. Petersburg, Fla. 33731

[21] Appl. No.: 55,918

[22] Filed: Jun. 1, 1987

[51] Int. Cl.⁴ .............................................. E02B 3/06
[52] U.S. Cl. ...................................... 405/31; 405/32; 405/284
[58] Field of Search ....................... 405/15, 21, 30, 31, 405/32, 35, 90, 107, 114, 115, 284

[56] References Cited

U.S. PATENT DOCUMENTS

| | | | |
|---|---|---|---|
| 245,473 | 8/1881 | Follett | 405/21 |
| 1,716,509 | 6/1929 | Smith | 405/32 |
| 3,757,527 | 9/1973 | Keller | 405/31 |
| 4,375,929 | 3/1983 | Clark | 405/114 |
| 4,564,316 | 1/1986 | Hunziker | 405/284 X |
| 4,690,588 | 9/1987 | Berger | 405/284 X |

Primary Examiner—David H. Corbin
Attorney, Agent, or Firm—Pettis & McDonald

[57] ABSTRACT

A seawall extension apparatus is provided for use with a capped seawall. The apparatus includes a wall section and a support assembly for holding the wall section such that the wall section extends generally upwardly from the cap of the seawall. The support assembly is releasably secured to the seawall cap.

18 Claims, 1 Drawing Sheet

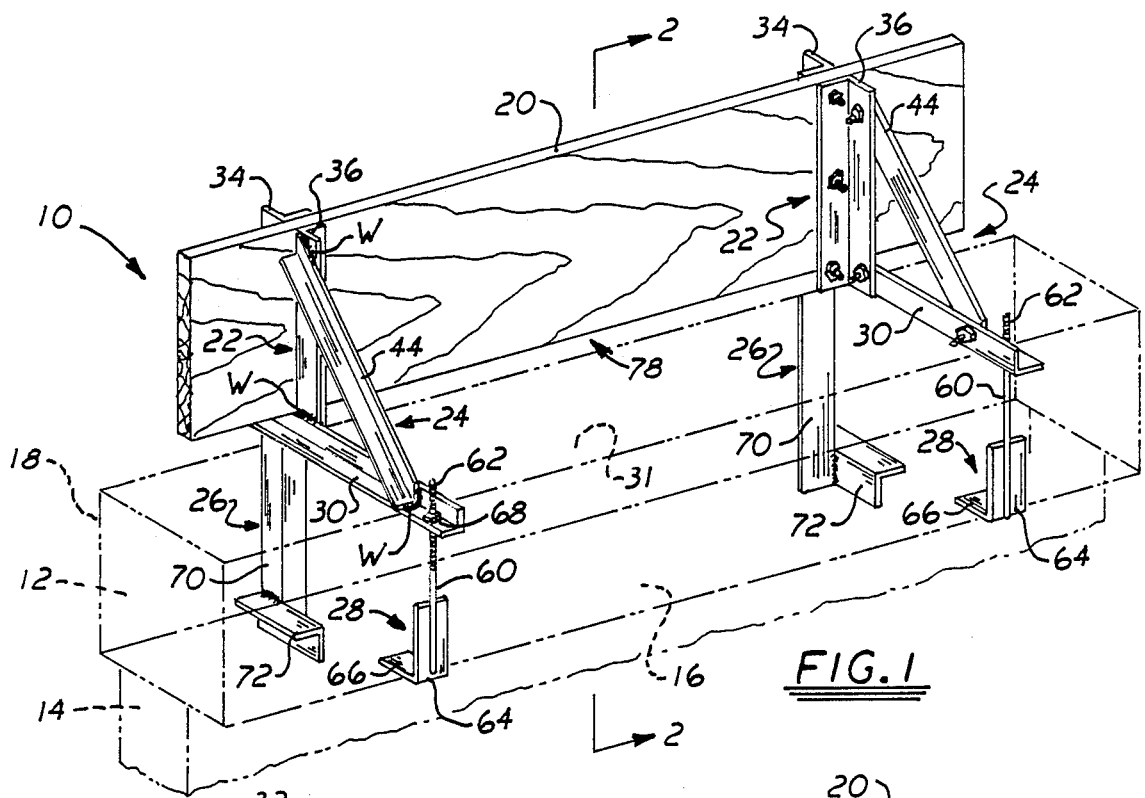
FIG. 1
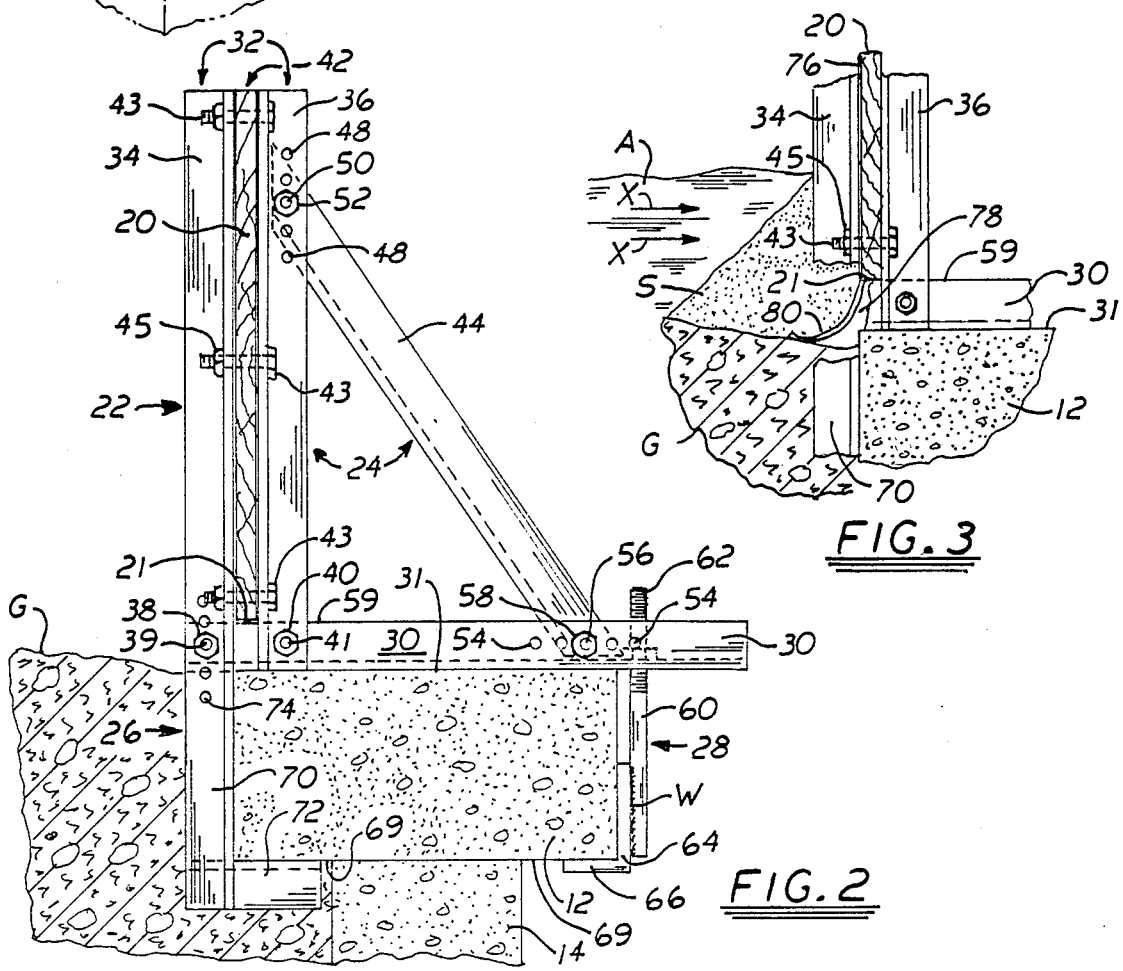
FIG. 3
FIG. 2

SEAWALL EXTENSION APPARATUS

FIELD OF THE INVENTION

This invention relates to a seawall extension apparatus and more particularly to a temporary adjustable extension apparatus for use with a capped seawall.

BACKGROUND OF THE INVENTION

Seawalls have long been employed to protect the shoreline against waves and rising high waters. Under ordinary conditions, for example during regular tidal cycles, most seawalls are able to perform this task adequately. However, when the rising water is driven by high winds or currents that typically accompany an ocean storm such as a hurricane the protection provided by the standard seawall may not be sufficient. The water may rise or crash over the top of the seawall and cause severe damage to the wall itself as well as to the soil or property being protected by the wall. Indeed, during a hurricane the rising water may crest above the seawall even days before the actual hurricane arrives, thereby causing particularly extensive soil erosion and damage to both the seawall and beach front property.

As shown in U.S. Pat. Nos. 98,953, 244,640 and 4,362,432 a number of conventional seawalls employ a tie back or support structure that is buried beneath the ground behind the seawall. Such supports are intended to reinforce the seawall against pounding surf. However such walls are particularly susceptible to waves or high water that crest over the wall. Soil is washed back with the retreating water, thereby exposing the typically wooden support structure. Repeated pounding may eventually cause the support structure and the wall itself to collapse and, as a result, even further damage is caused to the property and soil behind the wall.

SUMMARY OF THE INVENTION

This invention results from a realization that the strength and performance of seawalls and retaining walls that face the ocean or other body of water may be improved considerably, and that soil erosion from behind such seawalls may be significantly reduced, by providing a temporary adjustable seawall extension that may be secured to the cap of a seawall as required to resist the effects of large waves and rising water. To accomplish this beneficial result this invention features a seawall extension apparatus for use with a capped seawall. The apparatus includes a wall section, a support assembly for holding the wall section so that it extends generally upwardly from the cap of the seawall, and means for releasably securing the support assembly to the seawall cap.

In a preferred embodiment the means for releasably securing may include clamp means that are dependably connected to the support assembly. Adjustment means may be provided for selectively opening and closing the clamp means relative to the seawall cap. The clamp means are operated by opening or closing the clamp means as required such that the support assembly may be attached to seawall caps of various sizes. More particularly, the clamp means may include a lip portion that is selectively raised and lowered by the adjustment means and is engagable with the bottom of the seawall cap for clamping the support assembly to the cap. The adjustment means may include complementary first and second threaded means that are selectively engagable for fixing the position of the clamp means relative to the support assembly. Such adjustment means may further include an opening disposed in the support assembly. Preferably the first threaded means are carried by the clamp means and are axially slidable through the opening in the support assembly and the second threaded means are selectively engagable with the first threaded means to fix the position of the clamp means relative to the support assembly. The adjustment means may also include a plurality of substantially vertically arranged adjustment holes that are disposed in one of the support assembly and the clamp means. At least one complementary aperture is disposed in the other of the support assembly and the clamp means and connector means are receivable through an aligned hole and aperture for fixing the position of the clamp means relative to the support assembly.

The support assembly may include a pair of generally triangular support truss sections spaced apart longitudinally along the seawall cap. More specifically the support assembly may include at least one elongate base element that extends laterally across the upper surface of the seawall cap. At least one generally vertical support section may be attached to a respective base element and include means for accommodating the wall section. Such means for accommodating may include elongate inner and outer support elements that are connected to the base element and spaced apart laterally relative to the seawall cap to form a slot for receiving the wall section therebetween. Finally, the support assembly may include a generally diagonal cross brace that is interconnected between the base element and the inner element of the support section.

Adjustable means may be provided for connecting the cross brace to the base element and the outer support element. Such adjustable means may include a plurality of generally vertical holes in the outer support element, a complementary aperture disposed in the cross brace, and a connector element receivable through the aperture and one of the holes with which the aperture is aligned for connecting the cross brace to the inner support element. The adjustable means may also include a plurality of generally horizontal holes disposed in the base element, a complementary aperture disposed in the cross brace and a connector element that is receivable through the aperture and one of the holes with which the aperture is aligned for connecting the cross brace to the base element.

Preferably each of the support assembly pieces, including the base element, inner and outer vertical support elements and the cross brace are formed from a sturdy material such as metal and may comprise angle iron members or similar support pieces. Although the cross brace is described as adjustably attached between the vertical support section and the base section this is not a limitation of the invention, and each such cross brace may be welded or otherwise permanently attached between the base and vertical support sections. The clamp means may be integrally connected to the vertical support section and more specifically may be an integral extension of the outer vertical support element. The lip portion is typically welded or otherwise permanently attached to that integral extension. When two or more support truss sections are attached to the seawall cap each provides a slot for receiving the wall section. Such a wall section may comprise any suitable sturdy material such as wood or metal. The wall section is preferably fastened as by a screw or bolt and complementary nut to the vertical support sections of the support assembly.

Typically, when the apparatus is constructed as described above and mounted to the cap of a conventional seawall a space or gel is located between the wall section and the seawall cap. To prevent soil from filtering through that space and eroding from the land behind the seawall, filter means are attached to the wall section, and such filter means block at least a portion of the space between the wall section and the cap and serve to permit the flow of water but limit the flow of solids therethrough. Such filter means typically comprise a mesh-like fabric or similar material. Screen, cloth or other suitable materials may also be used. The filter means serve to trap the soil being carried out by the ebbing or subsiding water. As a result, a layer of sand and soil is built up behind the seawall. This not only tends to preserve this material and reduce erosion, but also serves to strengthen the seawall itself and make it even more resistant to rising water and waves.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a front perspective view of the seawall extension apparatus of the invention;

FIG. 2 is a sectional view of the seawall extension apparatus taken along line 2—2 of FIG. 1; and FIG. 3 is a partial side elevational view of the seawall extension apparatus similar to that of FIG. 2 with a portion of the support assembly broken away to show the filter means.

Similar reference characters refer to similar parts throughout the several views of the drawings.

DETAILED DESCRIPTION

There is shown in FIG. 1 a seawall extension apparatus, generally indicated as 10, according to this invention which may be temporarily and adjustably attached to the cap 12 of a conventional seawall 14. Outer surface 16 of seawall cap 12 faces the ocean or other body of water and inner surface 18 faces the land which wall 14 is serving to protect.

Extension apparatus 10 includes a wall section 20. Although the wall section illustrated in FIG. 1 constitutes a wooden board, alternatively, other rugged materials such as metal may be employed. Wall section 20 is supported to extend generally upwardly from seawall cap 12 by a support assembly, generally indicated as 22, that comprises a pair of generally triangularly shaped truss sections, generally indicated as 24, that are spaced longitudinally along the top of seawall cap 12. Means are also provided for releasably securing this support assembly 22 to cap 12 and such means comprise a pair of clamp means generally indicated as 26 and 28 that are adjustably connected to and depend from each truss section 24 of support assembly 22.

The construction and operation of each truss section 24 of support assembly 22 and its associated clamps 26 and 28 are shown in further detail in FIG. 2. In particular, each truss section 24 includes an elongate base element 30, which as shown most clearly in FIG. 1 may be formed by an angle iron or other sturdy element. Base element 30 extends laterally across the upper surface 31 of seawall cap 12. A generally vertical support section, generally indicated as 32 in the view of FIG. 2, extends upwardly from base element 30. Each such support section 32 comprises a pair of elongate inner and outer support elements 34 and 36 respectively that are connected to base element 30 by appropriate means of attachment such as respective nut and bolt attachments 38, 39 and 40, 41 or by other suitable means such as welding W as shown by the lefthand truss section in FIG. 1. Vertical support elements 34 and 36 are spaced apart laterally relative to the upper surface 31 of the seawall cap 12 so that a slot 42 is formed between them. Inner support element 34 is actually positioned so that it extends upwardly from the ground G behind seawall cap 12, and is integral with its respective clamp means 26.

A generally diagonal cross brace element 44 is interconnected between outer support element 36 of vertical support section 32 and base element 30. As shown in FIG. 2 and by the right hand truss section 24 in FIG. 1, adjustable means are preferably provided for connecting cross brace 44 and element 36. The adjustable means typically include a plurality of generally vertical holes 48 formed in element 36 and a complementary aperture at the upper end of member 44 that may be selectively aligned with one of the holes 48. When the desired alignment is made a connector element such as a bolt 50 is inserted through the aligned hole and aperture and is fixed in place by a nut 52. Similarly, a plurality of generally horizontal adjustment holes 54 are disposed along base element 30 and cross brace element 44 includes a complementary aperture at its lower end that is selectively alignable with one of these holes. When the desired alignment is made, a bolt 56 is inserted through the aligned hole 54 and aperture and the cross brace is fixed to the base element by a nut 58 that is attached to bolt 56. Such adjustable means permits the cross brace 44 of truss section 24 to be adjustably constructed for use with seawall caps of varying width. Alternatively, as exhibited by the left hand truss section 24 of FIG. 1, the cross brace may be permanently attached to the outer support element 36 and the base element 30 such as by welding W or other suitable means. As shown in FIG. 1, both the inner and outer support elements 34 and 36 and the cross brace 44 may be constructed of angle iron or other suitable sturdy material.

Wall section 20 is received by slot 42 and the bottom 21 of the wall section 20 engages the upper surface 59 of base element 30. Means such as bolts 43 are provided for fastening wall section 20 to support elements 34 and 36 of support section 32. In this manner wall section 20 is supported to extend generally upwardly from seawall cap 12 by the respective truss sections 24 of support assembly 22.

Each truss section 24 of support assembly 22 is releasably secured to seawall cap 12 in the following manner. Outer clamp means 28 and inner clamp means 26 are interconnected to support assembly 22 by respective adjustment means that enable the clamp means 26 and 28 to be adjustably opened and closed to engage seawall caps 12 of varying height. More specifically, clamp means 28 includes a rod-like element 60 that has a threaded upper end 62. An angled element 64 having a lip portion 66 is attached to the opposite end of rod element 60 by suitable means such as welding W. The upper threaded end 62 of element 60 is slidably receivable through a hole in base element 30 and a complementary threaded means such as a nut 68, shown most clearly in FIG. 1, is attached to the threaded upper end 62 of element 60 such that it engages the upper surface of base element 30. Nut 68 is tightened on threaded end 62 against element 30 until lip portion 66 snugly engages the bottom surface 69 of seawall cap 12. As a result, the position of element 60 and therefore clamp means 28 is fixed relative to truss section 24.

The opposite clamp means 26 is simply an integral extension of inner support element 34. As such, clamp means 26 typically comprises an angle iron portion 70 that depends from element 34 and extends into the ground G behind seawall 14. An angle iron lip portion 72 is attached by suitable means such as welding at a generally perpendicular angle to the lower end of section 70. As shown in FIG. 2, portion 70 of clamp means 26 includes a plurality of substantially vertically arranged adjustment holes 74 that may be selectively aligned with a complementary aperture proximate the end of base element 30 so that lip portion 72 snugly engages the bottom surface 69 of seawall 12. Connector bolt 39 is inserted through the selectively aligned hole and aperture and nut 38 is attached thereto to fix the position of both the clamp means 26 and the integrally attached vertical support section 34 to base element 30.

Apparatus 10 is installed on a seawall 14 in the following manner. Each truss section 24 of support assembly 22 is mounted to the seawall cap 12 by extending base elements 30 laterally across the upper surface of cap 12. The position of each cross brace 44 relative to horizontal holes 54 in base element 30 and vertical holes 48 in vertical support section 32 is then adjusted as required.

A hole at least as deep as the bottom surface of cap 12 is dug in ground G immediately behind cap 12. The hole is then extended beneath the cap and clamp means 26 is extended downwardly into the hole so that lip portion 72 extends beneath the cap and engages the bottom surface 69 thereof. Clamp means 26 is closed on the seawall cap by raising vertical support element 36 so that an appropriate hole 74 in clamp means 26 is aligned with the aperture proximate the end of base element 30 and further so that lip portion 72 snugly engages the bottom surface 69 of cap 12. Connecting bolt 39 is then inserted through the aligned hole and aperture and nut 38 is attached thereto to lock clamp means 26 in place on the seawall cap. The clamp means 26 of each truss section 24 is secured in this manner so that the support assembly 22 is firmly attached along the inner edge of the seawall.

Support assembly 22 is likewise secured to the outer edge of seawall cap 12 by clamp means 28. The threaded upper end 62 of element 60 is inserted through the opening in base element 30 and the clamp means 28 is raised until lip portion 64 snugly engages the bottom surface 69 of seawall cap 12. Nut 68 is then attached to the upper threaded end 62 and tightened to fix clamp means 28 in place relative to base element 30 and thereby lock the truss section onto the seawall cap 12. Of course the order of attaching the various clamp means 26 and 28 may be alternated as desired.

When the position of clamp means 26 and integral support section 34 have been fixed in the above described manner, slot 42 is defined. Accordingly, as shown in FIG. 1 when each of the truss sections have been releasably secured to cap 12 a plurality of slots 42 are formed and wall section 20 is simply inserted into these slots 42. Wall section 20 is then firmly fastened into place by bolts 43.

To release extension apparatus 10 from seawall cap 12 the clamp means 26 and 28 of each truss section are opened. For example clamp means 28 is open by removing nut 68 and lowering rod like element 60 through the opening in base element 30 to disengage lip portion 66 from the bottom surface 69 of the seawall. Likewise, clamp means 26 is opened by removing bolts 43 that interconnect vertical support section 22 and wall section 20 and then removing nut 38 and connecting bolt 39 that secure the clamp means 26 to base assembly 30. As a result, the grip of lip portion 72 on seawall cap 12 is loosened and support element 36 may be maneuvered to remove clamp means 26 from the hole in ground G behind seawall cap 12.

As shown in FIG. 3 water A that has crested over the top or around the sides of apparatus 10 collects behind the apparatus. As this water A retreats in the direction of arrows X toward the ocean or other body of water that the seawall faces, it erodes soil S and drags that soil so that it collects against the back wall surface 76 of wall section 20. To prevent soil S from escaping through the gap 78 between the bottom surface 21 of wall section 20 and the top surface 31 of seawall cap 12 a filter element 80 is attached to side 76 of wall section 20. Filter 80 typically comprises a mesh-like material such as a fabric that depends from the lower edge of wall section 20 in the manner shown. Filter 80 is attached to wall surface 76 such as by the bolts 43 and nuts 45 that attach wall section 20 to the vertical support elements 34 and 36 or by other suitable means. The filter 80 extends along the length of the bottom edge of wall section 20 between the respective vertical support elements 36. Filter 80 includes pores that permit water A to pass in the direction of arrows X through the filter 80 and return to the ocean or other body of water encountered by the seawall 14. At the same time, filter 80 blocks the flow of soil S and, as a result, that soil is trapped behind the extension apparatus 10 in the manner shown in FIG. 3. Soil reinforces and strengthens seawall 14 and extension apparatus 10. As a result, seawall 14 provides even better protection against waves or rising water.

It will thus be seen that the objects made apparent from the preceding description are efficiently obtained and since certain changes may be made in the above construction without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

Now the invention has been described, what is claimed is:

1. A seawall extension apparatus for use with a capped seawall, said apparatus comprising:
   a wall section;
   a support assembly for holding said wall section such that said wall section extends generally upwardly from the cap of said seawall, and
   means for releasably securing said support assembly to the cap of said seawall, said means for releasably securing comprising clamp means and adjustment means interconnecting said clamp means and said support assembly for selectively opening and closing said claim means relative to said seawall cap, whereby said clamp means are operated to secure said support assembly to said seawall cap.

2. The apparatus of claim 1 in which said clamp means include a lip portion that is selectively raised and lowered by said adjustment means and is engagable with a bottom surface of said seawall cap for securing said support assembly to said seawall cap.

3. The apparatus of claim 1 in which said adjustment means include complementary first and second threaded means carried respectively by said clamp means and said support assembly and being adjustably engagable for fixing the position of said clamp means relative to said support assembly.

4. The apparatus of claim 3 in which said adjustment means further include an opening disposed in said support assembly and in which said first threaded means is carried by said clamp means and axially slidable through said opening and said second threaded means are engaged by said support assembly and operatively engagable with said first threaded means for fixing the position of said clamp means relative to said support assembly.

5. The apparatus of claim 1 in which said adjustment means include a plurality of substantially vertically arranged adjustment holes disposed in one of said support assembly and said clamp means, at least one complementary aperture in the other of said support assembly and said clamp means, and connector means receivably through an aligned hole and aperture for fixing the position of said clamp means relative to said support assembly.

6. The apparatus of claim 1 in which said support assembly includes a pair of generally triangular support truss sections spaced apart longitudinally along said seawall cap.

7. The apparatus of claim 1 in which said support assembly includes at least one elongate base element that extends laterally across the upper surface of said seawall cap.

8. The apparatus of claim 7 in which said support assembly further includes at least one generally vertical elongate support section that is attached to a respective said base element and includes means for accommodating said wall section.

9. The apparatus of claim 8 in which said means for releasably securing include clamp means dependably connected to said generally vertical support section and adjustment means interconnecting said clamp means and said base element for selectively opening and closing clamp means relative to the cap of the seawall, whereby said clamp means may be operated to secures said support assembly to said seawall cap.

10. The apparatus of claim 9 in which said clamp means include a clamp element that is integrally connected to said generally vertical support section.

11. The apparatus of claim 8 in which said means for accommodating include elongate inner and outer support elements connected to said base element and spaced apart laterally relative to the seawall cap to form a slot for receiving said wall section therebetween.

12. The apparatus of claim 11 in which said support assembly further includes a generally diagonal cross brace element interconnected between said base element and said outer element of said support section.

13. The apparatus of claim 12 further including adjustable means for connecting said cross brace to said base element and said outer support element.

14. The apparatus of claim 13 in which said adjustable means include a plurality of generally vertical holes in said outer support element and a complementary aperture disposed in said cross brace and a connector element receivable through said opening and one of said holes with which said aperture is aligned for connecting said cross brace to said outer support element.

15. The apparatus of claim 13 in which said adjustable means include a plurality of generally horizontal holes disposed in said base element, a complementary aperture disposed in said cross brace and a connector element receivable through said aperture and one of said holes with which said aperture is aligned for connecting said cross brace to said base element.

16. The apparatus of claim 8 further including means for fastening said wall section to said support section.

17. The apparatus of claim 1 wherein a gap is located between said wall section and said seawall cap and further including filter means that are attachable to said wall section such that said filter means block at least a portion of said gap between said wall section and said seawall cap for transmitting fluid flow and limiting the flow of solids therethrough.

18. The apparatus of claim 17 in which said filter means include a mesh-like fabric.

* * * * *